March 10, 1959      F. ROTH ET AL      2,876,913
GARAGING STRUCTURE
Filed Dec. 29, 1953      3 Sheets-Sheet 3

INVENTORS:
FRANZ ROTH AND HANS WALTI
BY

United States Patent Office 2,876,913
Patented Mar. 10, 1959

2,876,913

GARAGING STRUCTURE

Franz Roth and Hans Walti, Zurich, Switzerland

Application December 29, 1953, Serial No. 400,912

2 Claims. (Cl. 214—16.1)

The present invention has reference to a garaging structure of two or more stories for the parking of vehicles which garaging structure comprises adjoining as well as superposed cells or stalls open at one side at least. The present application is a continuation-in-part of my previous application Serial No. 138,992, filed January 17, 1950, entitled "Garaging Structure."

It is an object of the present invention to provide a garaging arrangement by means of which motor vehicles or the like may easily, rapidly and automatically be parked.

It is another object of the present invention to provide a garaging arrangement which is so constructed that it is not necessary to place the motor vehicle or the like to be parked into an exact predetermined position.

With the above objects in view, the present invention mainly consists in a garaging arrangement which comprises a storage structure having a vertical front face and a plurality of receiving stalls each of which is adapted to receive a motor vehicle or the like, the receiving stalls being open at the front face, support means mounted for movement relative to the storage structure in a vertical plane near the front face of the storage structure, and engaging means adapted to engage and support a motor vehicle or the like and mounted on the support means for movement relative thereto between an outside position wherein the engaging means is on one side of the vertical plane and exterior of the storage structure and an inside position wherein the engaging means is on the other of this vertical plane and at least substantially within one of the receiving stalls. The engaging means include two elongated parallel horizontal engaging members extending substantially normal to the vertical plane, the engaging members being mounted for movement toward and away from each other and adapted to engage the wheels of the opposite axles of a motor vehicle or the like. Suitable moving means are provided for moving the engaging members toward and away from each other, which moving means include a plurality of driven members, respectively, and drive means for simultaneously driving the driving members thereby simultaneously moving the engaging members toward and away from each other so that when one of the engaging members engages the wheels of one axle of the motor vehicle or the like before the other of the engaging members engages the wheels of the other axle of the motor vehicle, the engaging means and support means are moved together horizontally relative to the storage structure until both of the engaging members engage, respectively, the wheels of opposite axles of the motor vehicle. In this way, the motor vehicle may be placed into and removed from any one of the stalls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the following description the structure is described mainly as applied to a large garage, but it is applicable to a storage magazine for other appropriate goods as well.

Figure 1:
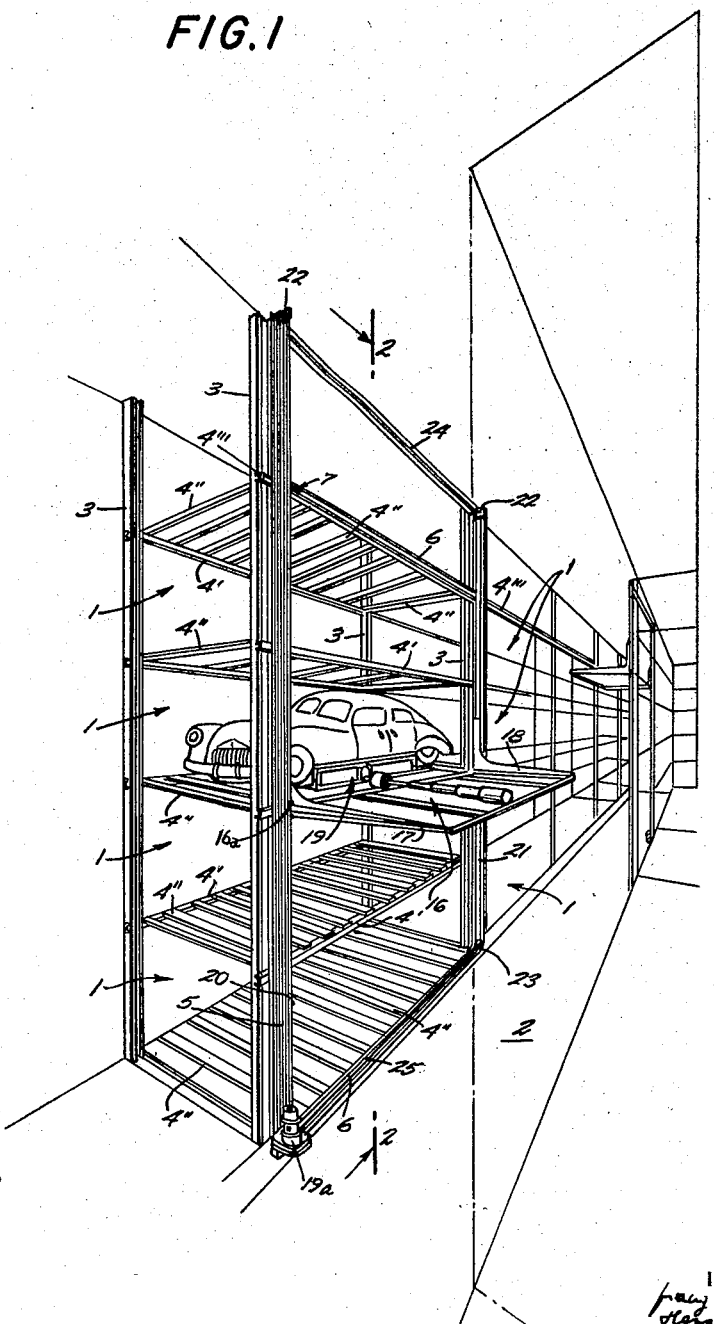
Fig. 1 is a general perspective view of a garaging arrangement according to the present invention.
Figure 2:
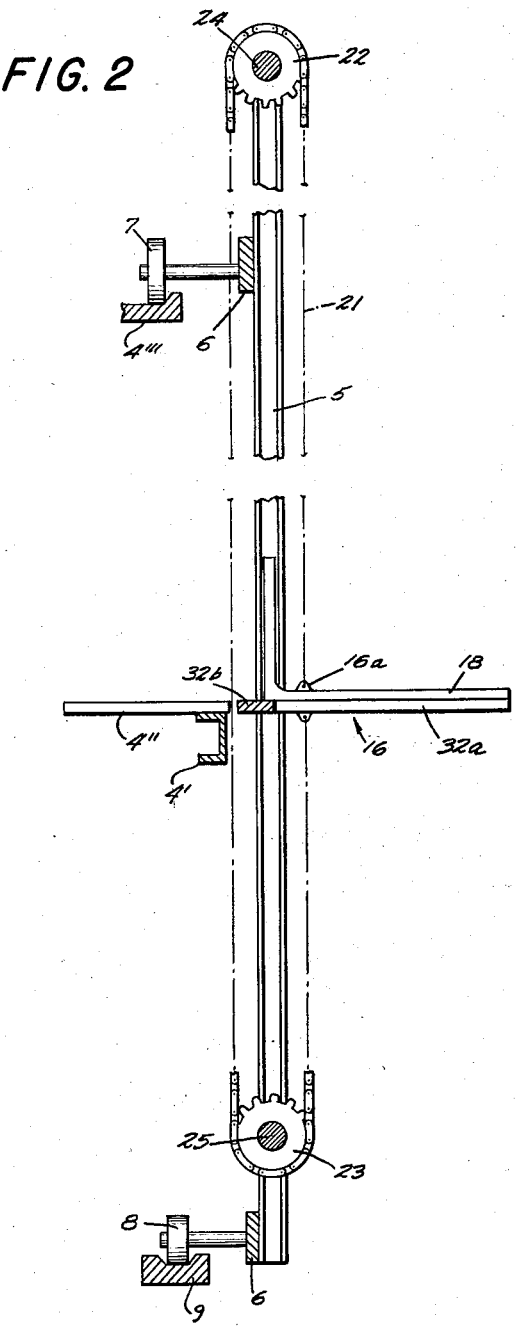
Fig. 2 is a fragmentary sectional elevational view taken substantially along line 2—2 of Fig. 1.

Figs. 1 and 2 show a view and details of the garage arrangement which consists of a storage building structure comprising a number of cells or receiving stalls 1 in juxtaposition and superposition, respectively. The cells 1 are open at their front at least and serve for the accommodation of the vehicles to be garaged. The storage structure comprises vertical posts 3 and horizontal connecting beams 4 which are preferably made as longitudinal and transverse holding rails 4', 4" constituting a floor structure. Advantageously one such structure is disposed at each of the opposite sides of a corridor 2.

In front of the open front side of each building structure is disposed a trolley displaceable in a vertical plane in horizontal direction along the structure. This trolley comprises a support frame the width of which substantially equals the length of each individual cell and the height of which frame corresponds to the total height of the building structure. The support frame comprises two vertical rails 5 which are secured together, at least at the top and at the bottom of the support frame by horizontal stays 6. The upper stay 6 is equipped at both ends with guiding rollers 7 by means of which the entire frame is suspended from an upper connecting beam 4'''. The lowermost stay 6 also is provided with similar guiding rollers 8 which bear against a rail 9 of the building structure. In this manner the entire frame is displaceable in a vertical plane along the building structure, such displacement being effected by optional means (not shown in the drawings), e. g. by means of an electric motor.

A support means in form of a lifting carriage 16 is arranged in the support frame and is vertically displaceable along said frame. This lifting carriage comprises two spaced L-irons 17 and 18 which are displaceable in vertical planes. For raising and lowering the lifting carriage an electric motor 19a is provided, said motor being adapted to operate chains 20 and 21 which are attached to the carriage 16 at 16a. The chains 20 and 21 are passed over upper and lower reversing rollers 22 and 23, respectively, which are interconnected by joint horizontal shafts 24 and 25.

Each vehicle to be garaged is transferred into the desired cell or stall by means of the lifting carriage 16 and engaging means 19 which serve as a support for the vehicle. The engaging means 19 on the lifting carriage 16 are adapted to be moved into and out of any one of said cells or stalls.

By virtue of the above arrangement, a vehicle may be placed into or removed from any one of the stalls. This is accomplished by positioning the engaging means on the lifting carriage 16 exteriorly of the storage structure, and then moving, if necessary by lowering, the lifting carriage 16 substantially to the level of the corridor 2. The engaging means are then moved into one of the lowest ones of the stalls 1. A vehicle is then driven onto the lifting carriage 16 and the engaging means moved under the car and caused to engage the latter, after which the carriage 16 is placed opposite whichever stall 1 the vehicle is to be placed into. This is accomplished by laterally displacing the trolley and/or raising the lifting carriage 16. The engaging means 19 together with the vehicle is then displaced by means of the displacing device 42, 43 until the vehicle is moved into the desired stall 1. The engaging means are then disengaged from the car and withdrawn from the stall leaving the car deposited therein, for instance on beams 4", and now the lifting carriage is ready for handling another vehicle.

Conversely, a vehicle is removed from any particular stall by inserting thereinto the engaging means 19, withdrawing them after engagement with the vehicle and lowering the lifting carriage 16 to the level of the corridor 2 after which the engaging means are disengaged and moved into an empty stall 1 on the ground floor, thus allowing the car to be driven away.

Figure 3:
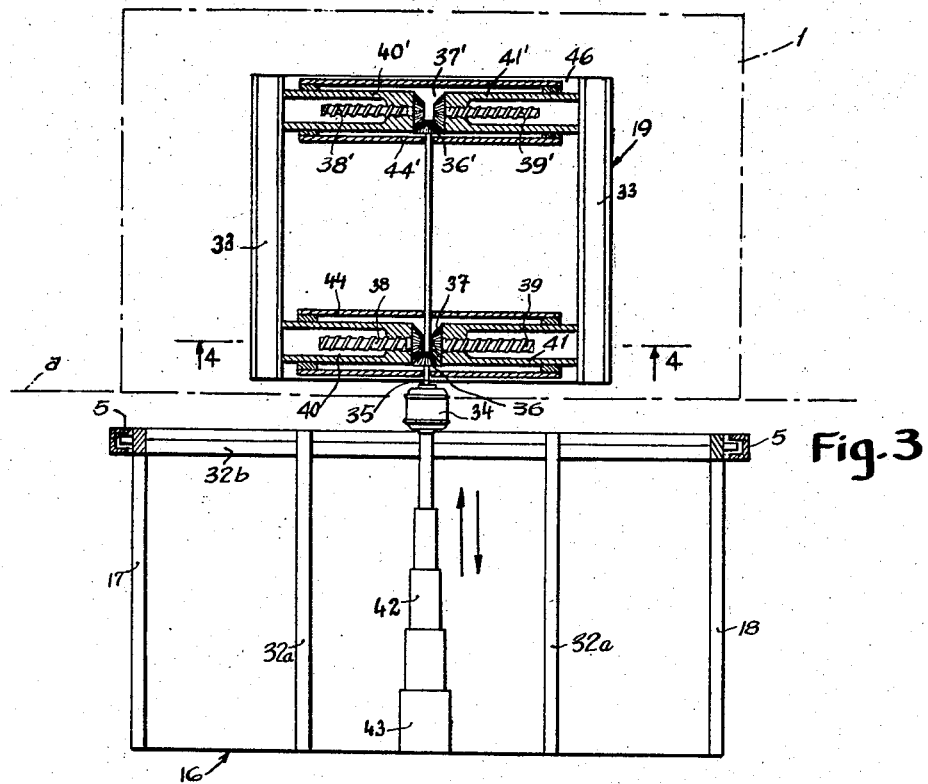
Fig. 3 is a plan view, partly in section, of a preferred embodiment of a mechanism for moving vehicles into and out of the individual stalls.
Figure 4:
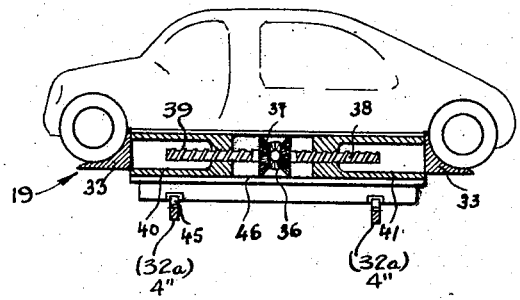
Fig. 4 is a sectional view taken substantially along lines 4—4 of Fig. 3 with elements 33 in extended position.

Figs. 3–4 illustrate an embodiment of engaging means and displacing mechanism for moving the vehicle into and out of the individual stalls 1, the vertical front face of the storage structure being indicated at a. The lifting carriage indicated generally at 16 is mainly composed of beams 32a and 32b between the L-irons 17, 18 and is mounted for up-and-down movement on the trolley frame, the vertical beams of which are indicated at 5. As explained above, the trolley is horizontally displaceable in a vertical plane parallel to the front face a of the storage structure. A suitable chain device, as, for example, the one illustrated in Fig. 2, is provided for raising and lowering the lifting carriage 16.

The carriage 16 incorporates engaging means 19 which include an electric motor 34 mounted between the engagement means and the displacing means described below, the shaft 35 of which drives via bevel gearing 36–37 and 36'–37' respectively two pairs of threaded spindles or screws 38, 39 and 38', 39'. The spindles 38, 39 and 38', 39' are rotatably supported by transverse beams 44 and 44' respectively but are not axially displaceable in relation to said beams. Pairs of threaded sleeves 40, 41 and 40', 41' are associated with the spindles 38, 39 and 38', 39', respectively, in such a manner that the sleeves are axially displaced when the spindles are rotated. The outer free ends of the threaded sleeves 40, 40' and 41, 41', respectively, are interconnected by carrying beams 33 which together with the other parts form a vehicle carrier frame. Thus when the spindles are rotated the distance between said carrying beams 33 can easily be varied, and during such variation the axial orientation of said beams remains unchanged.

The engaging means 19 comprise a support member 46 located underneath the beams 44, 44', and is capable of traveling on rollers 45 from the carriage 16 into a stall 1 or back, e. g. on beams 32a and/or beams 4". Said rollers are rotatably supported in the support member 46 and spaced from each other the same distance as the beams 32a and a corresponding pair of beams 4" aligned longitudinally with the beams 32a. Moreover, a telescopic tube 42 is provided which can be expanded and contracted by any known mechanical means, for example by a hydraulic power cylinder 43 provided for the operation of the aforedescribed displacing means. The entire device is disposed on the lifting carriage and is adapted to effect axial displacement of the carrier frame in the direction of the longitudinal axes of the carrying beams 33 into the position shown in Rig. 3 and back into position on carriage 16.

For garaging a vehicle the same is made to travel into the corridor 2 opposite a group of superimposed cells, whereupon the two carrying beams 33 are inserted between the front and rear wheels of the vehicle parallel to the vehicle axles. Then the spindles 38, 39, 38', 39' are rotated by the electric motor 34. Consequently the sleeves 40, 40', 41 and 41' are displaced on said spindles together with the two carrying beams 33 until, unusually, first one and then the other one of said beams, the two pairs of the vehicle wheels lifting them off the respective supporting surface by wedge action. Neither of these carrying beams can be moved any further but each bears against the pair of wheels that it engages. Thereafter the lifting carriage 16 together with the carrier frame (support member 46 and engaging means 19) is raised and, if necessary, is moved with the trolley 5, 6 along the structure towards a cell for the accommodation of the vehicle. The lifting carriage is lifted together with the vehicle to the level of the cell and there the displacing device is set in operation. The telescopic tube 42 is expanded and the carrier frame rolled into the cell. The electric motor is now started whereby the two carrying beams 33 are moved towards each other to disengage the car and then withdrawn to the exterior onto carriage 16 so that the latter is available for further use.

It will be seen from the above that a motor vehicle or the like which is exterior of the storage structure forming the stalls 1 may be engaged by engaging members which are the carrier beams 33, be moved while still exteriorly of the storage structure opposite one of the receiving stalls 1 thereof, and then be moved into such stall. Also, a vehicle in one of the stalls may, by following the reverse procedure, be removed and deposited exteriorly of the storage structure.

Having now fully described and ascertained our said invention and the manner in which it is to be performed, we declare that what we claim is:

1. A garaging arrangement comprising, in combination, a storage structure having a vertical front face and a plurality of receiving stalls each adapted to receive a motor vehicle or the like, said receiving stalls being open at said front face; support means mounted for movement relative to said storage structure in a vertical plane near said front face of said storage structure; and engaging means adapted to engage and support a motor vehicle or the like and mounted on said support means for movement relative thereto between an outside position wherein said engaging means is on one side of said vertical plane and exterior of said storage structure and an inside position wherein said engaging means is on the other side of said vertical plane and at least substantially within one of said receiving stalls of said storage structure, said engaging means including two elongated parallel horizontal engaging members extending substantially normal to said vertical plane, said engaging members being mounted for movement toward and away from each other and adapted to engage the wheels of opposite axles of a motor vehicle or the like, and moving means for moving said engaging members toward and away from each other, said moving means including a plurality of driven members connected to said engaging members, respectively, a plurality of driving members for moving said driven members, respectively, and drive means for simultaneously driving said driving members thereby simultaneously moving said engaging members toward and away from each other so that when one of said engaging members engages the wheels of one axle of the motor vehicle or the like before the other of said engaging members engages the wheels of the other axle of the motor vehicle or the like, said engaging means and support means are moved together horizontally relative to said storage structure until both of said engaging members engage, respectively, the wheels of opposite axles of the motor vehicle or the like, whereby a motor vehicle or the like exterior of said storage structure may be engaged by said engaging members of said engaging means, be moved exteriorly of said storage structure opposite one of said receiving stalls thereof, and be moved into said one receiving stall and whereby a motor vehicle or the like in one of said receiving stalls of said storage structure may be removed therefrom and deposited extreriorly of said storage structure.

2. A garaging arrangement comprising, in combination, a storage structure having a vertical front face and a plurality of receiving stalls each adapted to receive a motor vehicle or the like, said receiving stalls being open at said front face; support means mounted for movement relative to said storage structure in a vertical plane near said front face of said storage structure; and engaging means adapted to engage and support a motor vehicle or the like and mounted on said support means for movement relative thereto between an outside position wherein said engaging means is on one side of said vertical plane and exterior of said storage structure and an inside position wherein said engaging means is on the other side of said vertical plane and at least substantially within one of said receiving stalls of said storage structure, said engaging means including two elongated parallel horizontal engaging members extending substantially normal to said vertical plane, said engaging members being mounted for movement toward and away from each other and adapted to engage the wheels of opposite axles of a motor vehicle or the like, and moving means for moving said engaging members toward and away from each other, said moving means including a plurality of driven members connected to said engaging members, respectively, a plurality of driving members each mounted for rotation about an axis of rotation and threadedly engaging said driven members, respectively, for axially moving the same when each driving member is rotated about its axis of rotation, and drive means for simultaneously rotating each of said driving members about its respective axis of rotation thereby simultaneously moving said engaging members toward and away from each other so that when one of said engaging members engages the wheels of one axle of the motor vehicle or the like before the other of said engaging members engages the wheels of the other axle of the motor vehicle or the like, said engaging means and support means are moved together horizontally relative to said storage structure until both of said engaging members engage, respectively, the wheels of opposite axles of the motor vehicle or the like, whereby a motor vehicle or the like exterior of said storage structure may be engaged by said engaging members of said engaging means, be moved exteriorly of said storage structure opposite one of said receiving stalls thereof, and be moved into said one receiving stall and whereby a motor vehicle or the like in one of said receiving stalls of said storage structure may be removed therefrom and deposited exteriorly of said storage structure.

References Cited in the file of this patent

UNITED STATES PATENTS

| | | |
|---|---|---|
| 493,542 | Bessing et al. | Mar. 14, 1893 |
| 940,878 | Jones et al. | Nov. 23, 1909 |
| 1,554,584 | Lake | Sept. 22, 1925 |
| 1,584,080 | Dinkelberg | May 11, 1926 |
| 1,969,419 | Martin | Aug. 7, 1934 |
| 2,223,962 | Mitchell | Dec. 3, 1940 |
| 2,280,567 | Austin | Apr. 21, 1942 |
| 2,327,135 | Scott | Aug. 17, 1943 |
| 2,598,413 | Morley | May 27, 1952 |
| 2,663,434 | Pierce | Dec. 22, 1953 |

FOREIGN PATENTS

| | | |
|---|---|---|
| 337,726 | Great Britain | Oct. 28, 1930 |